United States Patent [19]

Sasse et al.

[11] 4,102,762

[45] Jul. 25, 1978

[54] PROCESS OF PREPARING MICROSPHERES USING ELECTROMAGNETIC RADIATION

[75] Inventors: Wolfgang Herman Fritz Sasse, Malvern East; Mervyn Benjamin Jackson, West Brunswick, both of Australia

[73] Assignee: ICI Australia Limited and Commonwealth Scientific and Industrial Research Organization, Melbourne, Australia

[21] Appl. No.: 563,174

[22] Filed: Mar. 28, 1975

[30] Foreign Application Priority Data

Apr. 3, 1974 [AU] Australia .............................. 7146/74

[51] Int. Cl.$^2$ ................................................. C08F 2/46
[52] U.S. Cl. ............................. 204/159.22; 204/159.23
[58] Field of Search ...................... 204/159.22, 159.23; 260/2.1 R, 2.1 E

[56] References Cited

U.S. PATENT DOCUMENTS

| B 423,404 | 3/1976 | Sasse | 204/159.22 |
|---|---|---|---|
| 3,097,096 | 7/1963 | Oster | 204/159.23 |
| 3,359,129 | 12/1967 | Mao | 204/159.23 |
| 3,814,702 | 6/1974 | Bourdon et al. | 204/159.23 |
| 3,912,693 | 10/1975 | Shimizu et al. | 204/159.23 X |
| 3,941,724 | 3/1976 | Boltd | 260/2.1 R |
| 3,976,629 | 8/1976 | Hayward et al. | 260/2.1 E |
| 3,985,632 | 10/1976 | Rembaum et al. | 204/159.15 |
| 3,990,958 | 11/1976 | Sasse | 204/159.22 |

*Primary Examiner*—Murray Tillman
*Assistant Examiner*—Thurman K. Page
*Attorney, Agent, or Firm*—Cushman, Darby & Cushman

[57] ABSTRACT

A method of polymerizing a composition comprising a mixture of monomers said monomer mixture containing a major proportion of an unsaturated carboxylic acid and a minor proportion of a crosslinking agent which method comprises irradiating a said mixture of monomers in a nonpolar and nonhydroxylic solvent with electromagnetic radiation having a wavelength greater than 180 nanometers and preferably less than 800 nanometers preferably in the presence of a photosensitive initiator, hereinafter referred to as a sensitizer, at a temperature in the range from 10° C to 90° C, the concentration of unsaturated carboxylic acid being less than 20% w/v, and isolating the polymer so formed.

10 Claims, No Drawings

PROCESS OF PREPARING MICROSPHERES USING ELECTROMAGNETIC RADIATION

This invention relates to a process for the polymerisation of unsaturated acids, in particular it relates to the manufacture of approximately spherical beads of crosslinked polymers of certain unsaturated carboxylic acids.

The manufacture of crosslinked polymers of unsaturated carboxylic acids is well known in the art. Known methods include bulk polymerisation of acrylic or methacrylic acid with a suitable crosslinking co-mer such as divinyl benzene, and the so-called pearl polymerisation of esters or anhydrides of unsaturated carboxylic acids. However, in the prior art processes it is difficult to obtain microfine spherical particles; by microfine we mean particles having an average size less than 20 microns. Microfine ion exchange resins are of use in the manufacture of cosmetics, pharmaceutical preparations, foodstuffs and in ion exchange processes, such as, for example, the "Sirotherm" process for the desalination of brackish water.

('Sirotherm' is a Registered Trade Mark for thermally regenerable ion exchange resins).

Unsaturated carboxylic acids are very reactive and their polymerisation or copolymerisation is difficult to control. It is known in the art that the polymerisation of certain derivatives of unsaturated carboxylic acids is more easily controlled than the polymerisation of the unsaturated acids. However it is difficult to hydrolyse the protecting group from the resultant polymers and therefore such methods are difficult to use for the production of microfine particles comprising acidic groups.

We have now found a process whereby polymers of unsaturated carboxylic acids suitable for 'Sirotherm' may be readily prepared using low energies and low cost equipment.

Accordingly we provide a method of polymerising a composition comprising a mixture of monomers said monomer mixture containing a major proportion of an unsaturated carboxylic acid and a minor proportion of a crosslinking agent which method comprises irradiating a said mixture of monomers in a nonpolar and nonhydroxylic solvent with electromagnetic radiation having a wavelength greater than 180 nanometers and preferably less than 800 nanometers preferably in the presence of a photosensitive initiator, hereinafter referred to as a sensitizer, at a temperature in the range from 10° C to 90° C, the concentration of unsaturated carboxylic acid being less than 20% w/v, and isolating the polymer so formed. In contrast to such polymers prepared by the prior art of γ-irradiation, the slurries are free-flowing and may be readily isolated by filtration.

By sensitizer we mean a compound capable of absorbing the electromagnetic radiation and initiating the polymerisation reaction. Suitable sensitizers are known to those skilled in the art for electromagnetic radiation of any given wavelength. Thus for example it is well known to those skilled in the art that ketones such as for example acetone are suitable sensitizers for electromagnetic radiation of wavelength in the region 200-300 nanometers and that certain natural products such as for example riboflavin are suitable sensitizers for sunlight.

A suitable sensitizer for any particular wavelength for light may be found by simple experimentation. We have examined the effect of typical sensitizers chosen from several of the main groups of known sensitizers with the following results. Benzoin derivatives proved to be the most useful sensitizers. Benzoin itself and alpha-methylbenzoin exhibited marginal activity but substituted or unsubstituted benzoin aryl or lower alkyl ethers wherein the alkyl group contains from 1 to 4 carbon atoms e.g. benzoin methyl ether, allylbenzoin methyl ether, and methylbenzoin methyl ether were active sensitizers between 300 and 400 nm. Above 360 nm riboflavin and chloranil appears to be effective.

Of the azo compounds studied azo-bis-isobutyronitrile was the most effective but the product was highly aggregated and irregularly shaped.

Aliphatic and aromatic ketones such as acetone and benzophenone exhibited no effect between 300 and 360 nm.

In certain circumstances impurities present in the reagents may be used as sensitizers and additional sensitizers need not then be added. The reaction mixture can also polymerise without a sensitizer with certain ranges of wavelength of electromagnetic radiation.

The nature of the solvent used to dissolve the monomers is critical to the success of the process of our invention. For the polymerisation to occur it is essential that the solvent is nonpolar and nonhydroxylic.

Satisfactory nonpolar solvents may be found by simple experimentation. For most efficient reaction we prefer to use solvents chosen from the group consisting of aliphatic ketones and aromatic hydrocarbons optionally substituted with chlorine or fluorine. Typical examples of our preferred solvents are acetone, benzene, chlorobenzene and mixtures thereof although polymerisation also occurs in cyclic ethers such as tetrahydrofuran.

Besides depending on the choice of solvent the yields of polymer also depend on such factors as concentration of monomers, the rate and intensity of irradiation, rate of stirring, nature and amount of sensitizer and the nature and amount of any impurities present. These factors are interdependent: thus the rate of stirring affects the amount of light absorbed; a more dilute solution will polymerise more slowly but a larger volume admits more light. In practice each of these factors may be optimized separately by one skilled in the art through routine and simple experimentation as shown in the Examples.

We have found that the primary particle size is insensitive, within the range of the variable covered, to the duration of irradiation, the concentration of the sensitizer, the presence of ethyl cellulose and only slightly dependent on the concentration of divinylbenzene (DVB). On the other hand we have found that in order to obtain particles in the size range of 1–4μ it is necessary to carry out the reaction at ambient temperature or above. At lower temperatures the particle size and also the extent of agglomeration in hexane increases. We have also found that irradiation of a solution with a methacrylic acid concentration greater than about 20% w/v gives products which are highly agglomerated in hexane.

The reaction is carried out usually in an inert atmosphere such as nitrogen or argon. The presence of air does not stop the polymerisation, and a small amount of oxygen may even be beneficial but a reduction in yield is observed when large amounts of oxygen are present.

The polymeric beads formed in our process may be used as the acidic component of the composite ion exchange particles described in U.S. Pat. No. 3,645,922. For this use the beads should be between 0.1 to 20 microns more preferably in the range from 1 to 5 microns in diameter. It is a very important feature of our invention that beads in this size range may be produced without difficulty.

Generally, the beads formed by the process of our invention after washing with acetone, air drying and then dispersing in hexane, appear as discrete particles of 1-5μ in diameter. However, it was found that after wetting the particles with water agglomeration occurred, usually giving extensive chain-like structures. The reason for this agglomeration is not clear for although it might be thought that the large quantities of soluble polymer contributes to the agglomeration, agglomeration of the washed resin was just as great. Furthermore, agglomeration remained extensive at pH 12 where it would be expected that electrostatic repulsion of the carboxylate anions should cause deaggregation. The aggregates can be broken up by ball-milling and although they reaggregate the particles remain discrete long enough to form a uniform mix which may be made into composite ion exchange beads as described in U.S. Pat. No. 3,645,922.

The source of electromagnetic radiation is not critical. Preferably the electromagnetic radiation has a reasonably narrow wavelength range. Suitable sources of radiation are for example sunlight or a low pressure mercury lamp. In a further embodiment of our invention the source of radiation may be a laser beam of suitable wavelength.

The process of our invention may be used as a batch process or more preferably as a continuous process. The process of our invention is particularly suited to a continuous process as the polymer may be readily obtained as a free-flowing slurry.

Preferred conditions for carrying out the process of our invention may be found by simple experiment.

Thus for example using methacrylic acid and divinyl benzene as monomers and monochlorobenzene as solvent we have found that free-flowing slurries of polymethacrylic acid containing up to 72% of crosslinked polymethacrylic acid can be prepared by irradiation of methacrylic acid and divinyl benzene in monochlorobenzene with visible blue light in 1 hour or less.

The preferred conditions were:
(1) To use about 2-5% divinyl benzene.
(2) To use about 1% MBME (on methacrylic acid).
(3) To maintain a temperature between ambient and 55° C, and
(4) To use a methacrylic acid concentration of less than about 20% (w/v).

Our invention is illustrated by, but by no means limited to, the following examples in which all parts are parts by weight unless otherwise specified.

EXAMPLES

Commercial methacrylic acid containing an inhibitor was used without purification. Technical grade divinyl benzene (Fluka) (50-55%) containing 1000 ppm p-tert-butyl catechol was used without purification. BDH monochlorobenzene (MCB) was used without purification. MCB was partially degassed by heating under vacuum on a rotary evaporator for 20 minutes and then stored under nitrogen. Solutions were irradiated in a Rayonet photochemical reactor fitted with 16 × 8 w lamps, catalogue No R.P.R. 3500° A. The temperature of the solutions during irradiation was maintained at about 30° C.

All experiments in which the solutions were irradiated at a controlled temperature were performed in a pyrex double-jacketed tube through which water from a constant temperature waterbath was circulated, except for Example 31 which was done in a similar vessel made of quartz and the walls of the reaction vessel were in each case scraped with either a stainless steel stirrer fitted with Teflon blades or an all-Teflon stirrer while stirring at 350 rpm.

EXAMPLE 1

A solution of MCB (44 ml), acetone (8 ml), MAA (10 ml), DVB (0.525 ml) and MBME (0.10 g) was irradiated for 2 hours with stirring at 350 rpm with nitrogen flowing over the solution in a large pyrex tube fitted with a stirrer designed to scrape the walls of the vessel. After about 15 minutes the solution showed the first sign of becoming colloidal. After 2 hours the suspension was still very thin and showed a Tyndall effect. The slurry was filtered under suction, washed with hexane and acetone and dried in vacuum at 50° to give PMAA (8.7 g, 82%) as a fine white powder. The PMAA was stirred for 2 days with water (200 ml) and centrifuged at high speed. The cake was stirred with ethanol and centrifuged. The cake was then stirred slowly in an Omnimix with 0.3 N sodium hydroxide solution (600 mls) for 15 minutes and centrifuged at 2000 rpm for 20 minutes. After repeating the sodium hydroxide treatment and centrifugation, the cake was stirred with 2 N hydrochloric acid (400 ml) and washed with 2 N hydrochloric acid for several hours and then with pH 3 hydrochloric acid until the pH of the effluent was 2.5. The polymer was dried in vacuum at 50° C to give 5.8 g (53%) of PMAA.

EXAMPLE 2

A solution of MCB (52 ml), MAA (10 ml), DVB (0.525 ml) and MBME (0.10 g) was stirred for 10 minutes at about 1000 rpm with a stream of nitrogen flowing through the apparatus in a large pyrex tube fitted with a stirrer designed to scrape the walls of the vessel. The stirring rate was reduced to 350 rpm and the solution irradiated for 1 hour to give a free flowing slurry which was filtered, washed with hexane and acetone and dried in vacuum at 50° C to give PMAA (9.3 g, 88%) as a fine white powder. The PMAA (9.3 g) was added with stirring to a beaker of pH 3 hydrochloric acid (91 ml) to give a slurry which settled fairly rapidly when the stirring was stopped. The particles were approximately spherical, 4-8μ in diameter with agglomerates 8-12μ in diameter.

An aliquot of the aqueous slurry (20 g) was diluted with water (200 ml) and titrated potentimetrically with a 1.0 N sodium hydroxide solution from which the capacity of the slurry was found to be 0.94 me/g. The particles in the suspension (at pH 11.5) were about 6-10μ in diameter and the agglomerates about 12-28μ in diameter.

A second aliquot of the aqueous slurry (20 g) was centrifuged at high speed. The clear supernatant (15.0 ml) was passed through a millipore filter (0.45μ) and an aliquot (5.0ml) titrated potentiometrically with a 0.1 N sodium hydroxide solution. The centrifuged cake was stirred with pH 3 hydrochloric acid and centrifuged, and the supernatant again titrated. The cake was again treated similarly, from which the total amount of soluble PMAA present in the acetone insoluble PMAA was found to be 36% and the yield of crosslinked PMAA was found to be 57%.

EXAMPLES 3 – 17

Example 2 was repeated a number of times with the changes shown in Table 1. The yield and properties of the product are also shown in Table 1. Solutions for Examples 3–10 were irradiated in pyrex test tubes while rotating on a Rayonet merry-go-round.

TABLE 1

PHOTOCHEMICAL POLYMERIZATIONS OF MAA : DVB (2.5%). (17% SOLIDS) PROCESS.

| Example No. | g of total monomers used | Solvents | "Irradiation" time (hr) | Sensitizer (1%) | stirring rate (rpm) |
|---|---|---|---|---|---|
| 1. | 10.5 | MCB 44 ml acetone 8 ml | 2 | MBME[a] | 350[h] |
| 2. | 10.5 | MCB 52 ml | 1 | MBME | 350[h] |
| 3. | 1.05 | MCB 4.4 ml acetone 0.8 ml | ½ | MBME | 0 |
| 4.[d] | " | benzene 5.2 ml | " | — | " |
| 5.[d] | " | " | " | MBME | " |
| 6.[e] | " | " | " | MBME | " |
| 7. | " | " | " | MBME | " |
| 8. | " | THF 5.2 ml | " | MBME | " |
| 9. | " | benzene 5.2 ml | " | benzophenone | " |
| 10. | " | " | " | AIBN | " |
| 11. | 10.5 | MCB 52 ml | 1 | MBME | 350[h] |
| 12. | " | " | 2 | MBME | " |
| 13. | " | " | 1 | MBME | " |
| 14. | " | " | 1 | MBME | " |
| 15. | " | " | ½ | MBME | " |
| 16. | 21 g | MCB 104 ml | 1 | MBME | " |
| 17. | " | " | 1 | MBME | 350[g] |

PRODUCTS

| Example No. | Yields (%) acetone insoluble | Yields (%) water soluble[b] | Yields (%) cross-linked | Particle[c] size | Particle[c] shape | solvent |
|---|---|---|---|---|---|---|
| 1. | 82 | 35 | 53 | 8μ | irregular | 0.1N NaOH |
| 2. | 88 | 35 | 57 | 8–10μ 12–28μ | particles agglomerates | 0.1N NaOH |
| 3. | 80 | 37 | 50 | 3μ | spherical | hexane or water |
| 4. | 0 | 0 | 0 | — | — | — |
| 5. | 0 | 0 | 0 | — | — | — |
| 6. | 90 | 100 | 0 | — | — | — |
| 7. | 76 | 400 | 45 | 3μ 1μ | — | hexane water |
| 8. | 4 | — | — | — | — | — |
| 9. | 0 | 0 | 0 | — | — | — |
| 10. | 75 | 45 | 41 | agglomerated | irregular | hexane or water |
| 11. | 78 | f | f | 3μ | agglomerates | water |
| 12. | 5 | f | f | — | — | — |
| 13. | 10 | f | f | — | — | — |
| 14. | 88 | f | f | — | — | — |
| 15. | 72 | f | f | — | — | — |
| 16. | 88 | f | f | — | — | — |
| 17. | 88 | f | f | — | — | — |

[a] β-methylbenzoin methylether
[b] this is the % of acetone (or hexane) insoluble PMAA which is water soluble
[c] these are very subjective measurements
[d] DVB alone
[e] MAA alone
[f] not measured
[g] stainless steel stirrer with Teflon blades
[h] all-Teflon stirrer

EXAMPLE 18

A solution of degassed MCB (52 ml), MAA (10 ml), DVB (0.525 ml) and MBME (0.10 g) was stirred at 350 rpm under nitrogen in a water-jacketed vessel for 18 minutes during which time the temperature stabilized at 55° ± 0.1° C. The solution was then irradiated for 1 hour, cooled, filtered, washed with acetone and dried to give PMAA (10.0 g, 95%) as a fine white powder. The PMAA (10.0 g) was slowly added to pH 3 hydrochloric acid (400 ml) with stirring. After stirring for ½ hour, the slurry was centrifuged at 2000 rpm for 20 minutes. The cake was again stirred with pH 3 hydrochloric acid (400 ml) overnight and centrifuged at 2000 rpm for 20 minutes. After a third washing with hydrochloric similar to the first, the cake was dispersed in pH 3 hydrochloric acid to give a slurry weighing 194 g. An aliquot (15.0 g) of the slurry was titrated with a 1.0 N solution of sodium hydroxide from which it was found that the yield of crosslinked PMAA was 69% and the amount of soluble PMAA present in the total PMAA was 28%.

EXAMPLE 19

A solution of degassed MCB (41 ml), MAA (20 ml), DVB (1.05 ml) and MBME (0.20 g) was stirred at 1000 rpm under nitrogen for 10 minutes and then irradiated for 1 hour while stirring at 350 rpm with an all-Teflon stirrer. The very thick paste was diluted with acetone, filtered, washed with acetone and dried to give a white, free-flowing powder of PMAA (19.2 g, 91%). The PMAA was washed three times with pH 3 HCl in a manner similar to that described in Example 18 and the yield of crosslinked PMAA found by titration to be 52%.

EXAMPLES 20 – 32

Example 18 was repeated with the changes shown in Table 2. The yield and properties of the product are also shown in Table 2.

In most cases 10 g of MAA was used but for Example 32 the quantity of MAA was adjusted as in Example 19 so that the total volume of the irradiated solution was equal to that of the other experiments to which it was to be compared.

TABLE 2

THE EFFECT OF VARIOUS PARAMETERS ON THE YIELD AND PARTICLE SIZE OF PHOTOCHEMICAL PMAA

| Example No. | Parameter varied | % Yield PMAA Total | % Yield PMAA cross-linked | % soluble PMAA in total PMAA | Before washing in hexane | Before washing in water | After washing in water, pH~3 | After washing in water, pH~12 |
|---|---|---|---|---|---|---|---|---|
| 18. | temperature controlled at 55° C | 95 | 69 | 28 | P: mainly 1–2μ  A: little | P: mainly 2–4μ  A: slower than usual | P: mainly 2–6μ few 8–12μ  A: slower but chains eventually formed | P: very few  A: up to 100 μ |
| 19. | MAA 32% w/v (instead of 16%) | 91 | 62 | 32 | P: no primary particles  A: nearly all 8–24μ | P: quite a few 1–3μ many 8–2μ  A: slowly formed chains | P: few <8μ mainly 8–16μ  A: up to 50μ, fairly easily broken | P: 12–16μ  A: fairly loosely clustered |
| 20. | none[e] 80 | n[c] | n | P[a]: 3μ | P: 3μ  A[b]: very little | P: 7–10μ  A: 30μ, extensive | n  A: 30μ | |
| 21. | " | 91 | 56 | 38 | n | P: 2–5μ  A: 20μ, chains | P: 8μ  A: 30–50μ, extensive | n  n |
| 22. | none hu e | ;88 | 57 | 36 | n | P: 4–8μ  A: 20μ, chains | n | P: 6–10μ  A: 12–28μ |
| 23. | worked up by steam distillation | 90 | n | n | P: 4μ  A: 20μ some | P: 4μ  A: 8–16μ, considerable | P: 7μ, very few  A: 16–70μ | n  n |
| 24. | irradiated 5 hr (instead of 1 hr) | 98 | 64 | 35 | P: 2–4μ  A: none | P: 2–8μ, even distribution  A: chains | P: 6μ  A: 20–50μ, very | P: 4–8μ  A: loosely clustered |
| 25. | 5% DVB (istead of 2.5) | 90 | 60 | 33 | P: mainly 4–6μ  A: very | P: 6–12μ  A: some than usual | P: 8–12μ  A: some, than usual | P: 8–12 μ  A: loosely |
| 26. | 0.5% MBME (instead of 1%) | 78 | n | n | P: nearly all 3–6μ  A: very little | P: mainly 4–8μ  A: 32μ, chains | n | n |
| 27. | ethyl cellulose added (0.6%) | 99 (96)[d] | 63 (51)[d] | 36 | P: mainly 2–5μ  A: little | P: mainly 1–4μ, some 3–6μ  A: slower than usual | P: 2–6μ  A: 8–50μ, extensive | P: mostly 2–5μ  A: loosely clustered |
| 28. | temperature reduced t0 11° C | 26 | 22 | 18 | P: 2–4μ  A: 12–30μ greater than usual | P: 3–7μ  A: up to 30μ, chains | n | n |
| 29. | thermostatted at 30+ 0.1° C ± | 86 | 48 | 44 | P: mainly 2–3μ, some 1–4μ some 1–4μ  A: very little | P: 3–4μ  A: some chains, less extensive | P: 2–6μ  A: chains | P: very few  A: large up to 100μ |
| 30. | temperature controlled at 3.6 to 7° C | 54 | 48 | 11 | P: larger than usual 4–8μ  A: greater than usual chains | P: 1–3μ 8–12μ (many)  A: rate slower than usual | P: mainly 8–12μ  A: extensive up to 50μ | P: very few  A: up to 100μ |
| 31. | temperature controlled at 80° C | 98,5 | 72 | 26 | P: mainly 1–3μ | P: mainly 2–5 | P: 2–4μ, some 6μ | P: very few |

TABLE 2-continued

THE EFFECT OF VARIOUS PARAMETERS ON THE YIELD AND PARTICLE SIZE OF PHOTOCHEMICAL PMAA

| Example No. | Parameter varied | % Yield PMAA Total | % Yield PMAA cross-linked | % soluble PMAA in total PMAA | Particle size and degree of agglomeration after various treatments Before washing in hexane | Before washing in water | After washing in water, pH~3 | After washing in water, pH~12 |
|---|---|---|---|---|---|---|---|---|
| 32. | MAA 24% (w/v) (instead of 16%) | 91 | 65 | 29 | A: some up to 12μ  P: very few, 1–3μ  A: nearly all 8–20μ | A: quite slow  P: lot 1–2 & 8–16μ  A: chains formed slowly | A: slower than for 27  P: very few, 8μ  A: up to 50μ | A: extensive chains  P: 12–16μ  A: fairly loosely clustered |

$^a$P = primary particles
$^b$A = agglomerates
$^c$not determined
$^d$yield if ethyl cellulose grafted to the PMAA
$^e$similar to example 2

We claim:

1. A method of preparing microspheres of size less than 20 microns by polymerising a composition comprising up to about 25% of a mixture of monomers said monomer mixture containing a major proportion of an unsaturated carboxylic acid and a minor proportion of a cross-linking agent which method comprises irradiating the said mixture of monomers in a nonpolar and nonhydroxylic solvent with electro-magnetic radiation having a wavelength greater than 180 nanometers, at a temperature in the range from 10° to 90° C, the concentration of unsaturated carboxylic acid being less than 20% w/v, and isolating the polymer so formed.

2. A method according to claim 1 wherein the wavelength is less than 800 nonometers.

3. A method according to claim 1 wherein the method is carried out in the presence of a photosensitive initiator.

4. A method according to claim 3 wherein the photosensitive initiator is chosen from the group consisting of substituted or unsubstituted benzoin aryl or lower alkyl ethers wherein the alkyl group contains from 1 to 4 carbon atoms and the electromagnetic radiation has a wavelength between 300 and 400 nm.

5. A method according to claim 3 wherein the photosensitive initiator is riboflavin or chloranil and the electromagnetic radiation is above 360 nm.

6. A method according to claim 3 wherein the photosensitive initiator is azo-bis-isobutyronitrile.

7. A method according to claim 1 inclusive wherein the solvent is chosen from the group consisting of aliphatic ketones and aromatic hydrocarbons optionally substituted with chlorine or fluorine.

8. A method according to claim 1 inclusive wherein the unsaturated carboxylic acid is methacrylic acid.

9. A method according to claim 8 wherein the concentration of methacrylic acid in the reaction mixture is less than 20% w/v.

10. A method according to claim 9 wherein the reaction mixture comprises between 2 and 5% w/v divinyl benzene, the photosensitive initiator is 1% weight α methyl benzoin methyl ether per weight of methacrylic acid and the reaction is carried out between ambient and 55° C and the electromagnetic radiation is visible blue light.

* * * * *